(12) United States Patent
Ichiryu

(10) Patent No.: US 9,623,709 B2
(45) Date of Patent: Apr. 18, 2017

(54) PNEUMATIC TIRE FOR RUNNING ON ROUGH TERRAIN

(71) Applicant: SUMITOMO RUBBER INDUSTRIES, LTD., Kobe-shi, Hyogo (JP)

(72) Inventor: Yutaka Ichiryu, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 788 days.

(21) Appl. No.: 13/936,459

(22) Filed: Jul. 8, 2013

(65) Prior Publication Data

US 2014/0041778 A1 Feb. 13, 2014

(30) Foreign Application Priority Data

Aug. 9, 2012 (JP) .................................. 2012-177472

(51) Int. Cl.
*B60C 11/11* (2006.01)
*B60C 11/03* (2006.01)

(52) U.S. Cl.
CPC ............. *B60C 11/11* (2013.01); *B60C 11/032* (2013.04); *B60C 11/0316* (2013.04); *B60C 2011/036* (2013.04); *B60C 2011/0381* (2013.04); *B60C 2200/10* (2013.04); *B60C 2200/14* (2013.04)

(58) Field of Classification Search
CPC ............ B60C 2200/10; B60C 2200/14; B60C 11/1376; B60C 11/11; B60C 11/0316; B60C 11/032; B60C 2011/036; B60C 2011/0381
USPC ........... 152/209.11; D12/510, 512, 513, 536, D12/542, 544, 545, 571, 577, 579, 580
See application file for complete search history.

(56) References Cited

U.S. PATENT DOCUMENTS 3,998,256 A * 12/1976 Verdier ................. B60C 11/032
152/209.1
5,031,680 A * 7/1991 Kajikawa ............... B60C 11/11
152/209.18
2008/0110541 A1 5/2008 Sueishi

* cited by examiner

*Primary Examiner* — Michael H Wilson
*Assistant Examiner* — Philip N Schwartz
(74) *Attorney, Agent, or Firm* — Birch, Stewart, Kolasch & Birch, LLP

(57) ABSTRACT

A pneumatic tire for running on rough terrain comprises a tread portion provided with center blocks, middle blocks and shoulder blocks to form a block tread pattern, wherein some or all of the center blocks are each provided with a slot positioned at the midpoint of the block in the tire circumferential direction, and extending axially inwardly from a sidewall surface of the block oriented toward a tread edge, and terminating within the block.

8 Claims, 8 Drawing Sheets

PNEUMATIC TIRE FOR RUNNING ON ROUGH TERRAIN

BACKGROUND OF THE INVENTION

The present invention relates to a pneumatic tire for running on rough terrain, more particularly to a tread structure suitable for a motorcycle tire, composed of blocks capable of increasing the grip and reducing the harshness when cornering.

In general, pneumatic tires for use in off-road vehicles such as motocross bike and rally car are provided with a block-type tread pattern made up of a plurality of blocks to exert a large drive power on soft ground such as sandy area and muddy area.

In order to increase the drive power and improve running performance on rough terrain, it is conceivable to form a recess (c) in the radially outer surface (b) of a block (a) as shown in FIG. 9 and FIG. 10. The recess (c) increases the edges of the block (a) and improves the grip. But, in the peripheral edge portion of the radially outer surface (b), the compressive stress increases and the apparent rigidity of the block (a) is relatively increased in the peripheral edge portion than in the central portion. As a result, in the case of a motorcycle tire, there is such a problem that, when the tire is tilted in order to make a turn, the harshness felt by the rider is emphasized, and further the lightness of handling is deteriorated.

SUMMARY OF THE INVENTION

It is therefore, an object of the present invention to provide a pneumatic tire for running on rough terrain in which the grip, the harshness when cornering and the lightness of handling can be improved.

According to the present invention, a pneumatic tire for running on rough terrain comprises a tread portion provided with center blocks, middle blocks and shoulder blocks to form a block tread pattern, wherein some or all of the center blocks are each provided with a slot positioned at the midpoint of the block in the tire circumferential direction, and extending axially inwardly from a sidewall surface of the block oriented toward a tread edge, and terminating within the block.

Therefore, by the slot, the slotted block is provided with additional edges to improve the grip performance of the tire. Since the slot reduces the rigidity of the slotted block in its tread edge side so as to deform appropriately, the harshness when cornering especially when the tilt angle of the tire is relatively small, can be reduced and the lightness of handling can be improved.

The pneumatic tire according to the present invention may be provided with the following additional features (1)-(7):
(1) when measured at the radially outer surface of the slotted block, the maximum circumferential width W2 of the slot is 0.10 to 0.30 times the maximum circumferential dimension L1 of the radially outer surface of the slotted block;
(2) when measured at the radially outer surface of the slotted block, the axial length L2 of the slot is 0.15 to 0.50 times the maximum axial dimension W1 of the radially outer surface of the slotted block;
(3) the depth of the slot is 0.25 to 0.50 times the height of the slotted block;
(4) the center blocks include a first center block disposed on the tire equator and provided with the two slots one on each side of the tire equator;
(5) the center blocks include a second center block disposed off the tire equator and provided with the single slot;
(6) some or all of the middle blocks are each provided with a slot extending axially inwardly from a sidewall surface of the block oriented toward a tread edge;
(7) some or all of the shoulder blocks are each provided with a slot positioned at the midpoint of the block in the tire circumferential direction, and extending axially outwardly from a sidewall surface of the block oriented toward the tire equator, and terminating within the block.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like.

DESCRIPTION OF THE PREFERRED EMBODIMENTS

Embodiments of the present invention will now be described in detail in conjunction with the accompanying drawings.

Figure 1:
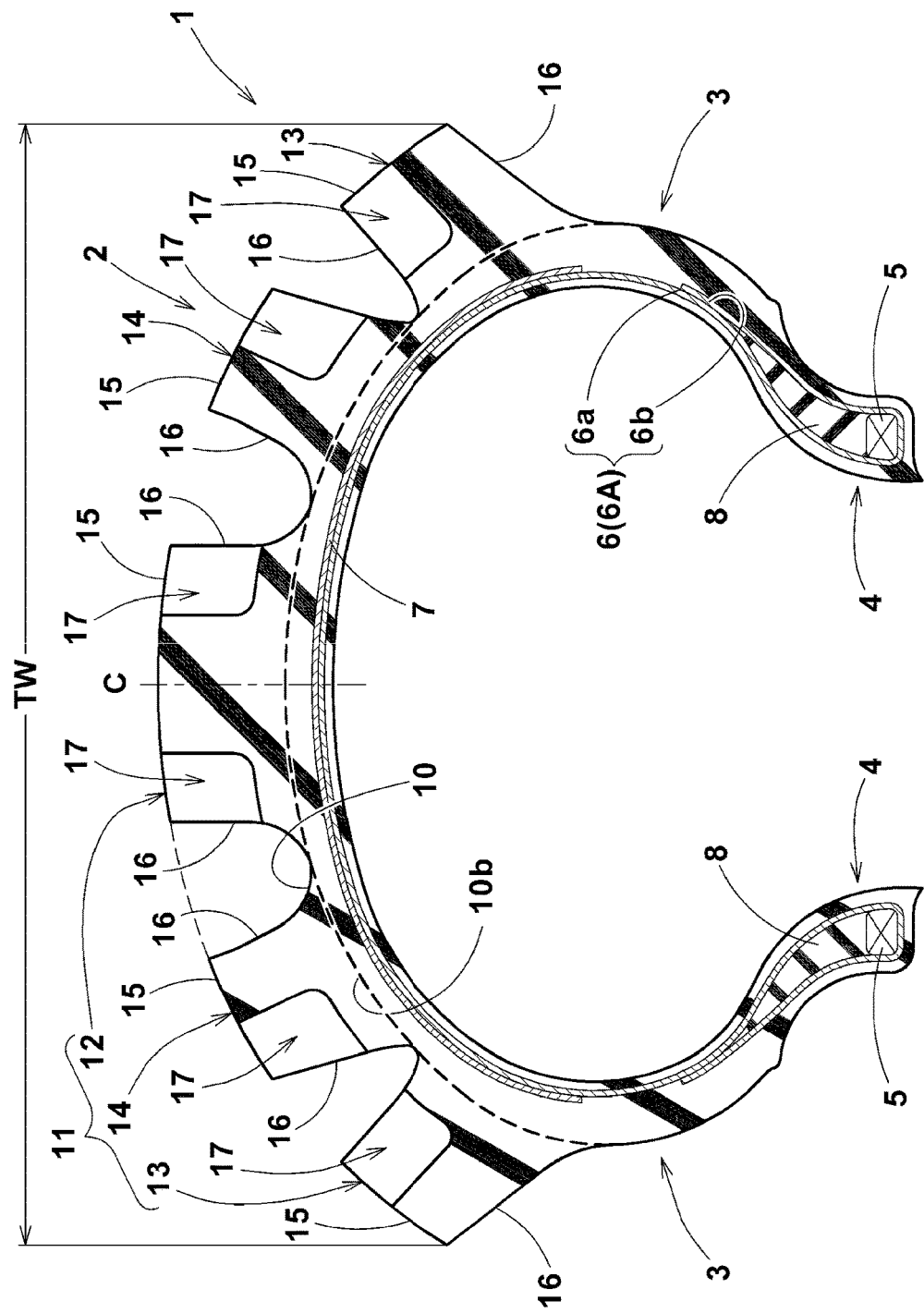
FIG. 1 is a cross sectional view of a pneumatic tire as an embodiment of the present invention.

FIG. 1 show a pneumatic tire 1 as an embodiment of the present invention in its normally inflated unloaded state. In this embodiment, the tire 1 is designed as a motorcycle tire.

The tire 1 comprises a tread portion 2, a pair of sidewall portions 3, a pair of bead portions 4 each with a bead core 5 therein, a carcass 6 extending between the bead portions 4 through the tread portion 2 and sidewall portions 3, and a tread reinforcing cord layer 7 disposed radially outside the carcass in the tread portion.

The carcass 6 is composed of at least one, in this example only one ply 6A of cords arranged radially at an angle in a range of from 90 to 70 degrees with respect to the tire equator C and extending between the bead portions 4 through the tread portion 2 and sidewall portions 3, and turned up around the bead core 5 in each bead portion 4 from the inside to the outside of the tire so as to form a pair of turned up portions 6b and one main portion 6a therebetween.

The bead portions 4 are each provided between the main portion 6a and the turned up portion 6b of the carcass ply 6A with a bead apex 8 made of a hard rubber extending radially outwardly from the bead core 5 in order to reinforce the bead portion 4.

The tread portion 2 (inclusive of the carcass 6, tread reinforcing cord layer 7 and a tread rubber thereon) is curved with a relatively small radius of curvature when compared with the passenger car tires, truck/bus tires and the like, and as a result, the maximum cross section width TW of the tire lies between the tread edges Te.

Figure 2:
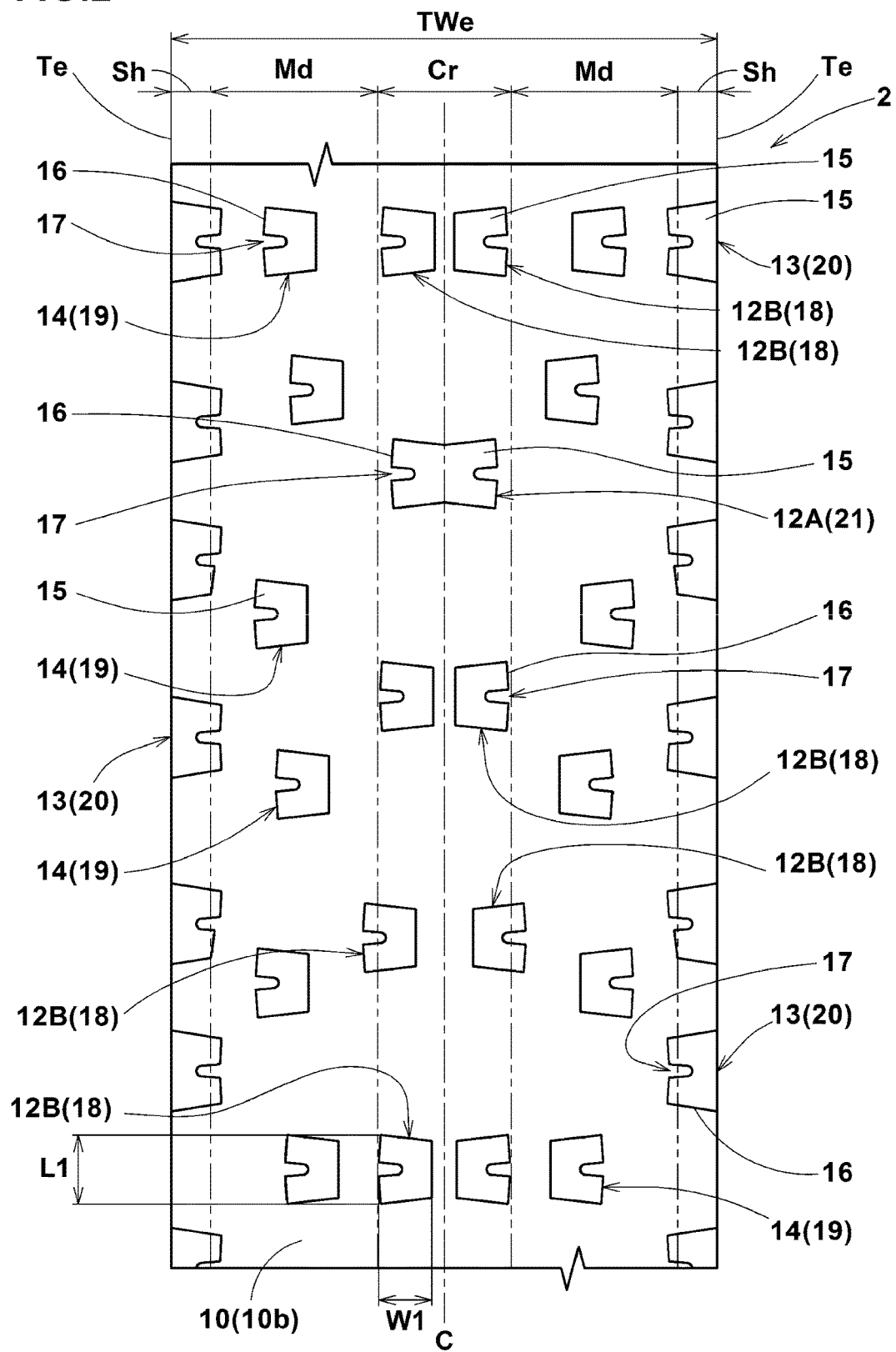
FIG. 2 is a developed partial view of the tread portion thereof.

FIG. 2 shows an example of the tread pattern designed for use in motocross races so as to bring out maximum performance on soft ground such as sandy area and muddy area.

The tread portion 2 is provided with a plurality of blocks 11 to form a block type tread pattern.

The land ratio of the tread portion (namely, the ratio of the total area of the radially outer surfaces 15 of all the blocks 11 to the overall area of the tread portion 2) is set in a range of from 8% to 30% to improve the grip performance on soft ground and to improve self ejection of the mud stuck between the blocks.

In this embodiment, in the cross section parallel with the tire circumferential direction and in the cross section parallel with the tire axial direction, the radially outer surface 15 of each block has a radius of curvature which is the same as or larger than the radius of curvature of the tread profile or the tread surface of the tread portion 2, inclusive of the radially outer surface 15 which is completely flat, in order that the radially outer surface 15 effectively exerts its edge effect on a rough terrain.

As shown in FIG. 2, the blocks 11 disposed in the tread portion 2 are grouped into three groups: center blocks 12, middle blocks 14 and shoulder blocks 13, according to their axial positions.

The center block 12 is such that at least 60% of the area of the radially outer surface 15 is disposed in a tread crown region Cr. Here, the tread crown region Cr is such a region centered on the tire equator C and having a developed width of 25% of the developed tread width Twe between the tread edge Te.

The shoulder block 13 is such that its edge forms a part of the tread edge Te or at least 60% of the area of the radially outer surface 15 is disposed in a tread shoulder region Sh. Here, the tread shoulder region Sh is such a region extending axially inwardly from the tread edge Te and having a developed width of 10% of the developed tread width Twe.

The middle block 14 is such that at least 60% of the area of the radially outer surface 15 is disposed in a middle region Md. Here, the middle region Md is such a region extending between the tread crown region Cr and the tread shoulder region Sh (or between a position of 10% from the tread edge and a position of 12.5% from the tire equator C).

The height D1 of the blocks 12, 13 and 14 from the radially outer surface 15 thereof to the tread base (groove bottom) 10b is preferably set in a range of from 7 to 19 mm.

In this embodiment, the center blocks 12 include a first center block 12A disposed on the tire equator C and a second center block 12B disposed off the tire equator C.

The first center block 12A extends axially across the tire equator C and has a generally rectangular top shape being long in the tire axial direction than in the tire circumferential direction.

The second center block 12B has a generally rectangular top shape being long in the tire circumferential direction than in the tire axial direction. The area of the radially outer surface of the second center block 12B is about one half of that of the first center block 12A.

In the example of the tread pattern shown in FIG. 2, between every two of the first center blocks 12A, there are disposed three pairs of the second center blocks 12B. The paired blocks 12B are disposed line-symmetrically about the tire equator C. In the three paired blocks 12B, the middle paired blocks 12B are disposed far from the tire equator when compared with other two paired blocks 12B.

Some of the center blocks 12 (in this embodiment all of the center blocks 12) are formed as a slotted block 18, 21.

The slotted block 18 is provided with a single slot 17.

The slotted block 21 is provided with two slots 17.

The larger first center block 12A is formed as the slotted block 21 with two slots 17. The smaller second center block 12B is formed as the slotted block 18 with a single slot 17.

Figure 3:
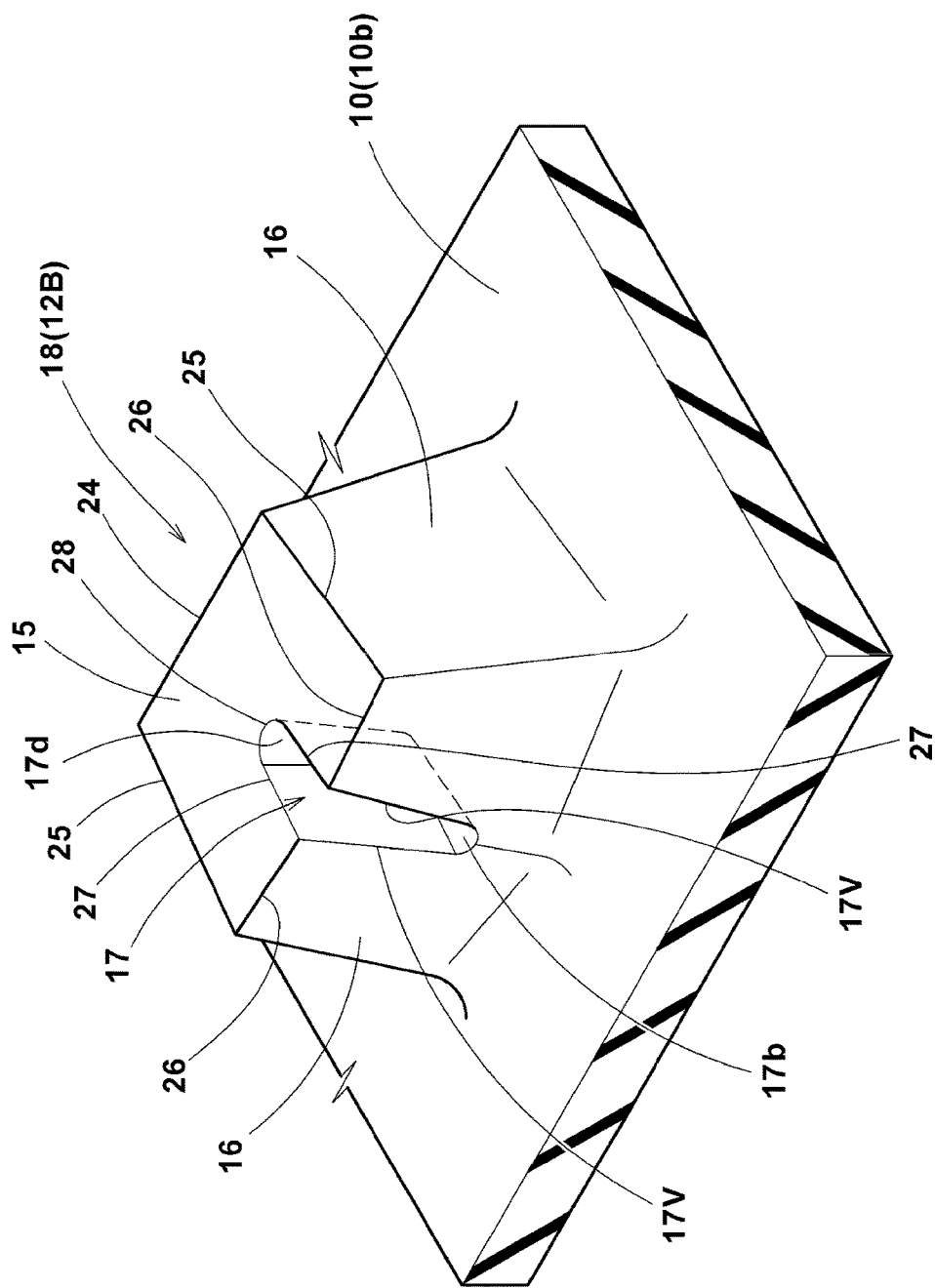
FIG. 3 is a perspective view of a slotted block thereof provided with a single slot.
Figure 4:
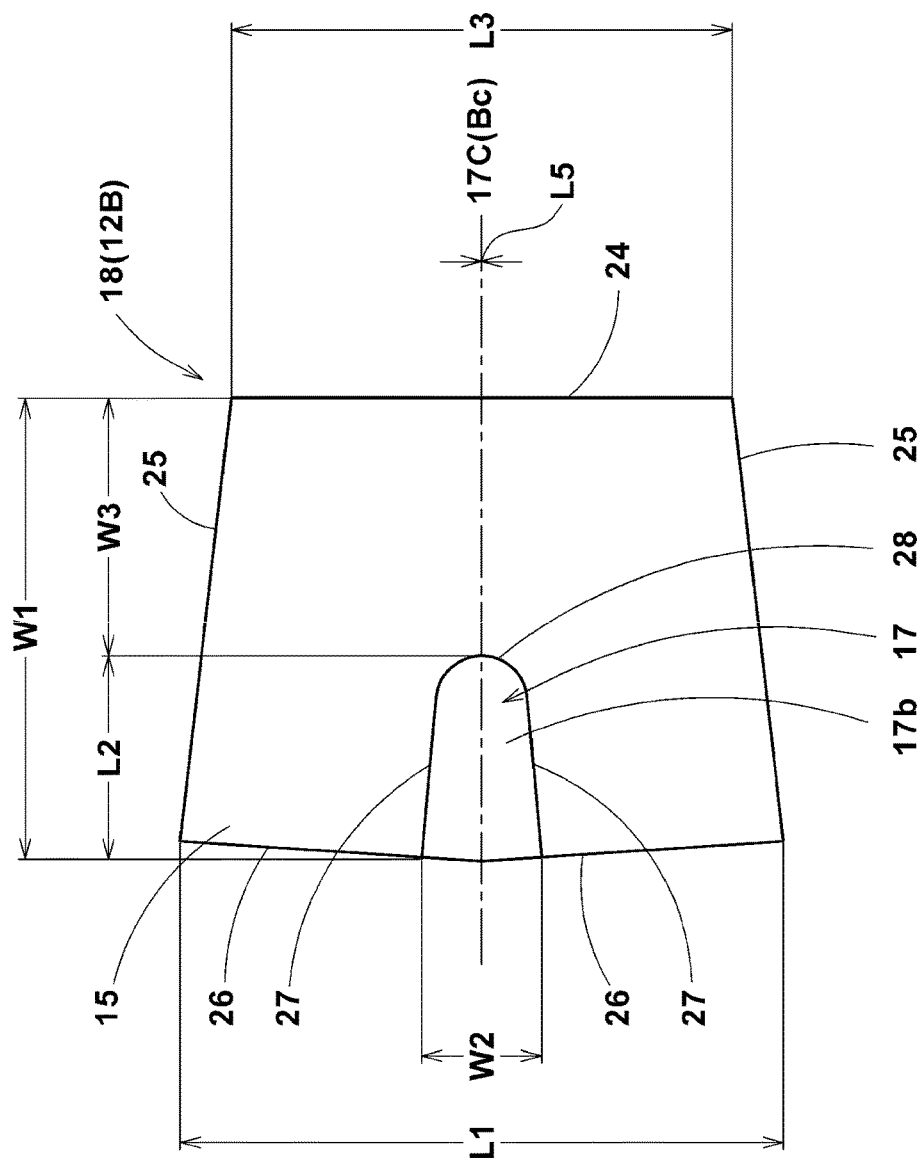
FIG. 4 is a top view thereof.
Figure 5:
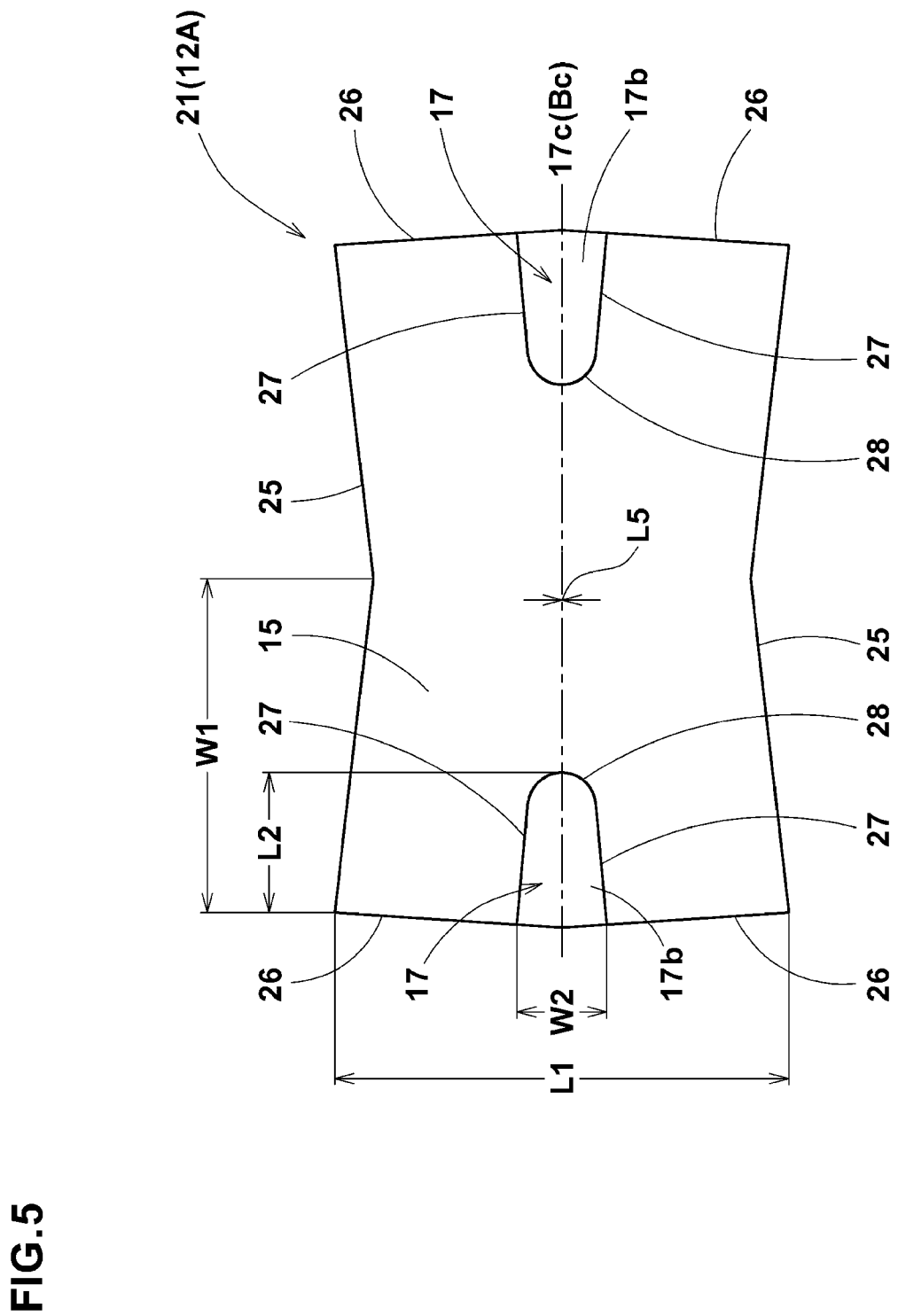
FIG. 5 is a top view of a slotted block provided with two slots.

FIG. 3 shows the slotted block 18 with a single slot 17. FIG. 4 shows the top view thereof. FIG. 5 shows the top view of the slotted block 21 with two slots 17.

As shown in FIG. 4 and FIG. 5, the slot 17 is positioned at a substantially midpoint of the circumferential dimension of the radially outer surface 15 of the block 18, 21 and, the slot 17 extends axially inwardly from a sidewall surface 16 of the block oriented toward one of the tread edges Te and terminates within the block so that the slot 17 has an axially outer open end and an axial inner closed end.

The slot 17 increases the edges of the block and improves the grip performance during cornering. The slot 17 decreases the rigidity of the block in its tread edge side so that, during cornering, the block can be deformed appropriately in the tread edge side. As a result, the harshness when cornering, the lightness of handling, and the ground contact feeling during cornering can be improved.

By the slot edges 27, the block can improve the grip at the time of acceleration or deceleration.

The slot 17 has to be positioned at the midpoint of the block in the tire circumferential direction so that as shown in FIGS. 4 and 5, the circumferential distance L5 between the center line Bc of the block, passing through the midpoint of the maximum circumferential dimension L1 in parallel with the tire axial direction and the widthwise center line 17C of the slot 17 becomes at most 25%, preferably at most 5% of the maximum circumferential dimension L1.

In the examples shown in FIGS. 4 and 5, the distance L5 is zero. The widthwise center line 17C of the slot 17 is parallel with the tire axial direction. Thereby, the slotted block can be prevented from breaking.

If the distance L5 is more than 25% of L1, there is a possibility that the steering stability is deteriorated.

It is preferable that the angle of the widthwise center line 17C of the slot 17 with respect to the tire axial direction is not more than 10 degrees.

Preferably, the maximum circumferential width W2 of the slot 17 is 0.10 to 0.30 times, preferably 0.10 to 0.20 times the maximum circumferential dimension L1 of the radially outer surface 15 of the block.

If the width W2 is less than 0.10 times the dimension L1, it becomes difficult to reduce the harshness. If the width W2 is more than 0.30 times the dimension L1, there is a possibility that the rigidity of the slotted block 18 becomes insufficient and the block is broken or torn off.

Figure 6:
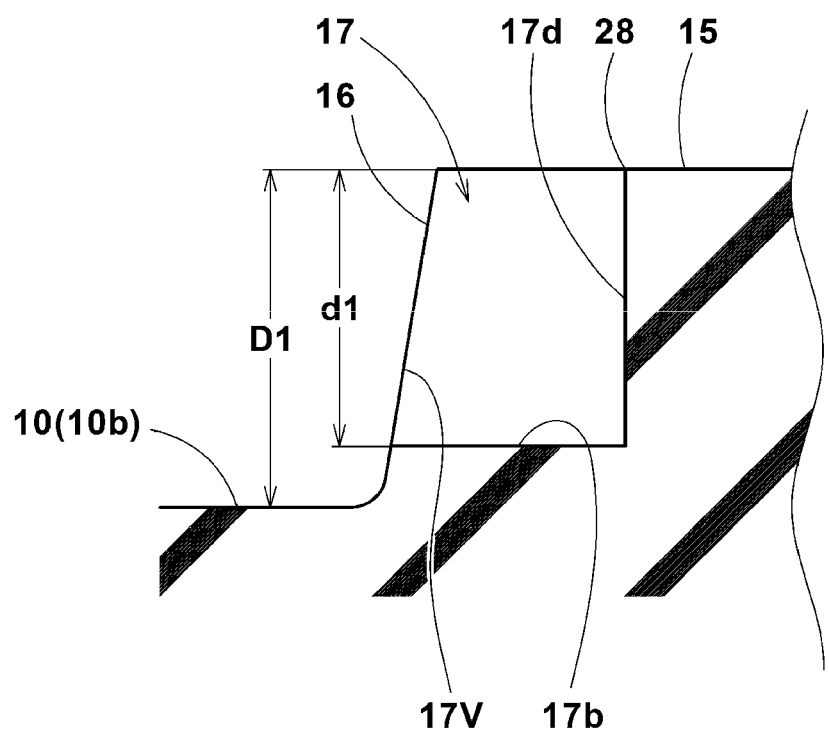
FIGS. 6, 7 and 8 are cross sectional views each showing an example of the configuration of the slot taken along the widthwise center line of the slot.
Figure 7:
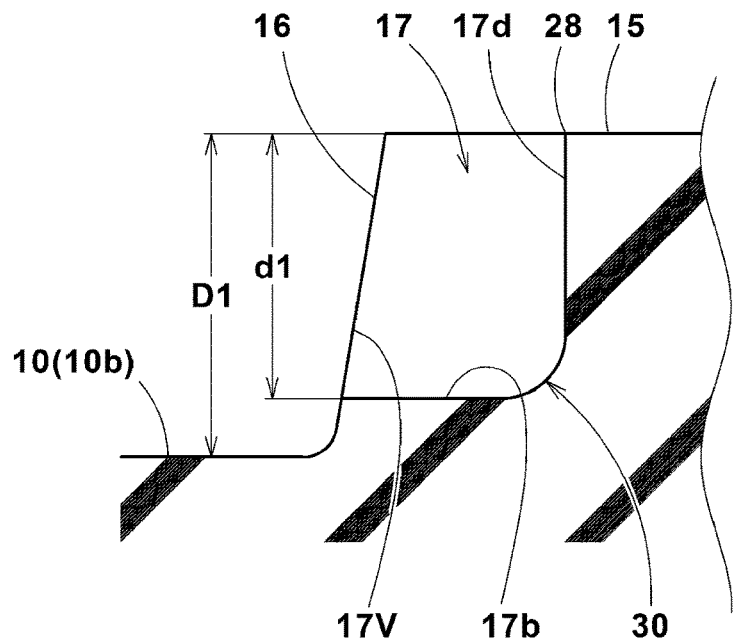
Figure 8:
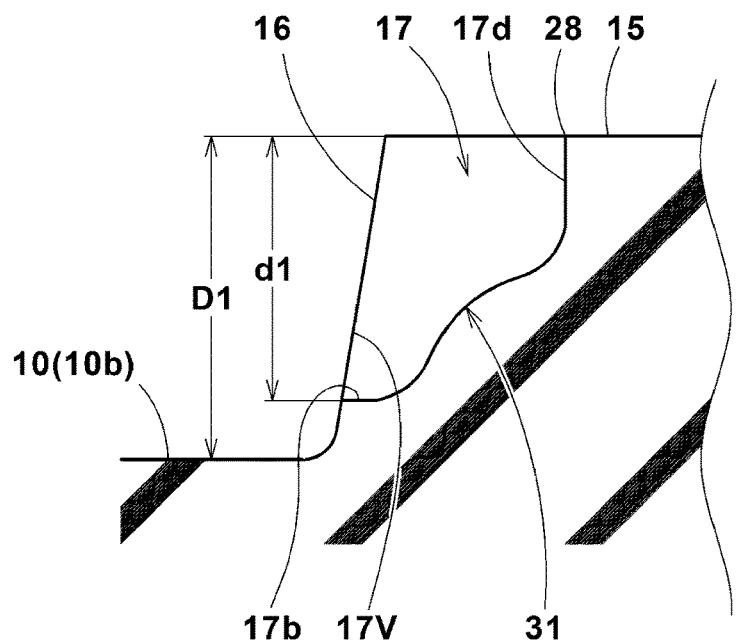

As shown in FIGS. 6-8, the depth d1 from the radially outer surface 15 of the slotted block to the bottom 17b of the slot 17 is preferably set in a range of from 0.25 to 0.50 times, more preferably 0.33 to 0.50 times the height D1 of the slotted block.

If less than 0.25 times, then the rigidity of the slotted block can not be reduced in the tread edge side, and the harshness can not be reduced. If more than 0.50 times, then there is a possibility that the circumferential rigidity of the block becomes insufficient.

By the open end of the slot 17, as shown in FIG. 3, an axially outer sidewall surface 16 of the slotted block 18, 21 is provided with radially extending edges 17V, which helps to enhance the edge effect of the block when digging into the earth. Preferably, the edges 17V are inclined so as to gradually get away from each other toward the radially outside from the radially inside, which helps to prevent an entrapment of small objects such as stones in the slot 17.

In an example shown in FIG. 6, a sidewall surface 17d of the slot 17 extending from the arc-shaped edge 28 toward the bottom 17b of the slot 17 intersects with the bottom 17b of the slot 17 extending parallel with the radially outer surface 15 at a right angle.

In order to prevent the occurrence of cracks at the corner between the sidewall surface 17d and the bottom 17b, it is preferred that an arc-shaped chamfered part 30 as shown in FIG. 7 is formed between the bottom 17b and the sidewall surface 17d.

It is also preferred that a multi-arc chamfered part 31 as shown in FIG. 8 is formed between the bottom 17b and the sidewall surface 17d.

In the case of the slotted block 18 (second center block 12B), as shown in FIG. 4, the radially outer surface 15 has:
an axial inner edge 24 extending parallel with the tire circumferential direction;
two lateral edges 25 extending axially outwardly from both ends of the edge 24;
two axial outer edges 26 extending toward one another from the axial outer ends of the two lateral edges 25 to the slot 17;
two slot edges 27 extending from the opposed ends of the axial outer edges 26 toward the axial inner edge 24; and
an arc-shaped slot edge 28 extending between the axial inner ends of the slot edges 27.

With respect to the tire axial direction, the lateral edges 25 are inclined at numerically identical inclination angles so that the lateral edges 25 gradually get away from each other toward the axially outside from the axially inside.

By the inclined lateral edges 25, the ground contact feeling at the time of acceleration or deceleration becomes uniform, and the steering stability is improved.

In order to improve the grip during cornering by increasing the circumferential component of the block edges, it is preferable to configure the radially outer surface 15 of the slotted block 18 (second center block 12B) such that the maximum circumferential dimension L1 is more than the maximum axial dimension W1 as shown in FIG. 4.

The maximum circumferential dimension L1 of the radially outer surface 15 is preferably set in a range of from 9 to 39 mm. The minimum circumferential dimension L3 of the radially outer surface 15 is preferably set in a range of from 0.70 to 1.0 times the maximum circumferential dimension L1.

If the dimension L1 becomes less than 9 mm, the circumferential rigidity of the block 18 decreases, and the grip at the time of acceleration or deceleration is decreased. If the dimension L1 becomes more than 39 mm, the block 18 become liable to lean axially, and the grip during cornering is decreased.

The maximum axial dimension W1 of the radially outer surface 15 is preferably set in a range of from 10 to 30 mm. If the dimension W1 is less than 10 mm, the axial rigidity of the block 18 decreases, and the cornering performance is deteriorated. If the dimension W1 is more than 30 mm, the block 18 become liable to lean circumferentially, and the grip at the time of acceleration or deceleration is decreased.

In order to improve the grip performance during cornering and to secure a necessary rigidity and strength for the slotted block 18, the axial length L2 of the slot 17 is preferably equal to or less than the axial distance W3 from the arc-shaped edge 28 to the axial inner edge 24.

More specifically, it is preferable that the axial length L2 is 0.15 to 0.50 times the maximum axial dimension W1.

In the case of the slotted block 21 (first center block 12A), as shown in FIG. 5, the radially outer surface 15 has:
two lateral edges 25 extending axially and slightly bent at its middle point in the tire axial direction;
two axial outer edges 26 extending toward one another from the axial ends on one side, of the two lateral edges 25 to the slot 17;
two slot edges 27 extending from the opposed ends of the axial outer edges 26 on one side, toward the axially inside;
an arc-shaped slot edge 28 extending between the axial inner ends of the slot edges 27 on one side;
two axial outer edges 26 extending toward one another from the axial ends on the other side, of the two lateral edges 25 to the slot 17;
two slot edges 27 extending from the opposed ends of the axial outer edges 26 on the other side, toward the axially inside; and
an arc-shaped slot edge 28 extending between the axial inner ends of the slot edges 27 on the other side.

With respect to the tire axial direction, the lateral edges 25 are inclined at numerically identical inclination angles so that the lateral edges 25 gradually get away from each other toward the axially outside from the axially inside.

By the inclined lateral edges 25, the ground contact feeling at the time of acceleration or deceleration becomes uniform, and the steering stability is improved.

In this example, as shown in FIG. 5, each half of the radially outer surface 15 of the slotted block 21 (first center block 12A) is the same as the radially outer surface 15 of the slotted block 18.

When the tire is tilted either side, right or left, to initiate right turn or left turn, the first center block 12A is appropriately deformed in the same side to reduce the harshness and improve the lightness of handling and the ground contact feeling during cornering.

With respect to the tire axial direction, the slot edges 27 are also inclined at numerically identical inclination angles so as to become substantially parallel with the adjacent lateral edges 25.

Further, it is preferable that some or all of the middle blocks 14 are formed as a slotted block 19 which is the same as the above-mentioned slotted block 18 as shown in FIG. 2. In this embodiment, each of the middle blocks 14 is the slotted block 19. The slotted block 19 can reduce the harshness when cornering where the tire 1 is inclined more.

Preferably, some or all of the shoulder blocks 13 are formed as a slotted block 20. In this embodiment, each of the shoulder blocks 13 is the slotted block 20.

Unlike the above-mentioned slotted blocks 18 and 19, a single slot 17, which is provided at the midpoint of the slotted block 20 in the tire circumferential direction, extends axially outwardly from its axially inner sidewall surface 16 oriented toward the tire equator C and terminates within the block. Therefore, when the tire is largely tilted or the tire sinks into soft ground, the slotted block 20 can improve the grip during cornering.

Comparison Tests

Figure 9:
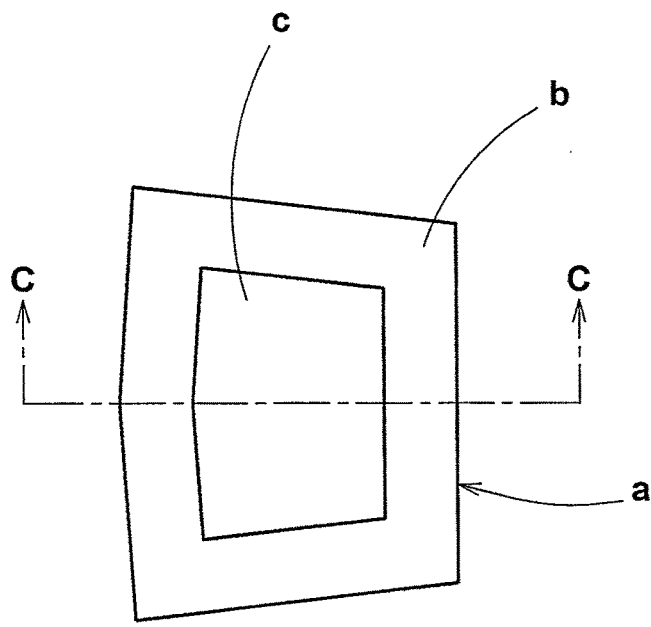
FIG. 9 is a plan view of a block used in the undermentioned comparison test.
Figure 10:
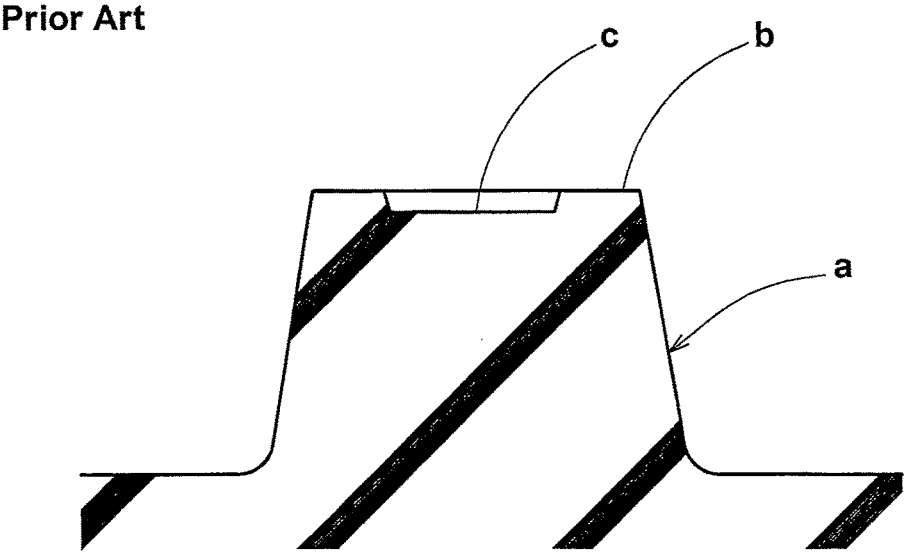
FIG. 10 is a cross sectional view thereof taken along line C-C in FIG. 9.

Off-road motorcycle tires (size 90/100-21 M×51F) having the internal structure shown in FIG. 1 were prepared and tested. The tread patterns were prepared based on that shown in FIG. 2. The specifications of the tread patterns are shown in Table 1. The followings are common to all the tires.
- block height D1: 12 mm
- circumferential dimension L1: 14 mm
- axial dimension W1: 12 mm In the comparative example tire Ref. 1, instead of the slotted blocks 18 and 21, the block (b) shown in FIGS. 9 and 10 was used in the same block arrangement as that in FIG. 2.

In the comparative example tire Ref. 2, the slots were formed to extend across the respective blocks.

In the test, the test tire was mounted on the front wheel of a 450 cc motocross bike and inflated to 80 kPa, and then the test rider evaluated the harshness, grip and lightness of handling during running the bike in a motocross test course. The results are shown in Table 1 by an index based on comparative example tire Ref. 1 being 100, wherein the larger the index number, the better the performance.

TABLE 1

| Tire | Ref. 1 | Ref. 2 | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|
| slot depth d1 (mm) | — | 6 | 6 | 6 | 6 | 6 | 6 | 4 | 10 | 6 | 6 |
| slot length L2 (mm) | — | 14 | 6 | 6 | 6 | 5 | 8 | 6 | 6 | 6 | 6 |
| slot width W2 (mm) | — | 3 | 3 | 2 | 5 | 3 | 3 | 3 | 3 | 3 | 3 |
| bottom configuration (FIG. No.) | — | — | 6 | 6 | 6 | 6 | 6 | 6 | 6 | 7 | 8 |
| harshness | 100 | 100 | 110 | 105 | 110 | 110 | 105 | 105 | 105 | 110 | 110 |
| grip | 100 | 95 | 110 | 105 | 105 | 105 | 105 | 105 | 100 | 110 | 110 |
| lightness of handling | 100 | 95 | 105 | 105 | 110 | 110 | 110 | 110 | 100 | 105 | 110 |

From the test results, it was confirmed that the tires according to the present invention can be improved in the harshness, grip and lightness of the handling.

The invention claimed is:

1. A pneumatic tire for running on rough terrain comprising:
    a tread portion provided with blocks including center blocks, middle blocks and shoulder blocks to form a block tread pattern, wherein
    the center blocks are
        first center blocks each provided with plural slots and disposed on the tire equator, and
        second center blocks each provided with a single slot and disposed off of the tire equator,
    the middle blocks are each provided with a single slot,
    the shoulder blocks are each provided with a single slot,
    said plural slots of each first center block are two slots, which are positioned at the midpoint of the first center block in the tire circumferential direction, and which respectively extend axially inwardly from two opposite sidewall surfaces of the first center block oriented toward respective tread edges, and terminate within the first center block,
    said single slot of each second center block is positioned at the midpoint of the second center block in the tire circumferential direction, and extends axially inwardly from a sidewall surface of the second center block oriented toward the adjacent tread edge, and terminates within the second center block, and
    said single slot of each shoulder block is positioned at the midpoint of the shoulder block in the tire circumferential direction, and extends axially outwardly from a sidewall surface of the shoulder block oriented toward the tire equator, and terminates within the shoulder block.

2. The pneumatic tire according to claim 1, wherein when measured at the radially outer surface of the slotted block, the maximum circumferential width W2 of the slot is 0.10 to 0.30 times the maximum circumferential dimension L1 of the radially outer surface of the slotted block.

3. The pneumatic tire according to claim 1, wherein when measured at the radially outer surface of the slotted block, the axial length L2 of the slot is 0.15 to 0.50 times the maximum axial dimension W1 of the radially outer surface of the slotted block.

4. The pneumatic tire according to claim 1, wherein the depth of the slot is 0.25 to 0.50 times the height of the slotted block.

5. The pneumatic tire according to claim 1, wherein the tread portion is curved so that the maximum cross section width of the tire lies between the tread edges.

6. The pneumatic tire according to claim 1, wherein the tread portion has a land ratio of from 8% to 30%.

7. The pneumatic tire according to claim 1, wherein said blocks disposed in the tread portion are the center blocks, the middle blocks and the shoulder blocks.

8. The pneumatic tire according to claim 1, wherein
    said blocks disposed in the tread portion are the center blocks, the middle blocks and the shoulder blocks,
    the center block is defined such that at least 60% of the area of the radially outer surface thereof is disposed in a tread crown region defined as being centered on the tire equator and having a developed width of 25% of the developed tread width between the tread edges,
    the shoulder block is defined such that an edge thereof forms a part of the tread edge, or at least 60% of the area of the radially outer surface thereof is disposed in a tread shoulder region defined as extending axially inwardly from each tread edge and having a developed width of 10% of the developed tread width, and
    the middle block is defined such that at least 60% of the area of the radially outer surface thereof is disposed in a middle region defined as extending between the tread crown region and each tread shoulder region.

* * * * *